United States Patent
Suzuki

(10) Patent No.: US 8,554,508 B2
(45) Date of Patent: Oct. 8, 2013

(54) METHOD AND APPARATUS FOR INSPECTING INTERNAL PRESSURE OF CAN OF CANNED GOODS

(75) Inventor: Osafumi Suzuki, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 482 days.

(21) Appl. No.: 12/867,904

(22) PCT Filed: Feb. 16, 2009

(86) PCT No.: PCT/JP2009/052506
§ 371 (c)(1),
(2), (4) Date: Aug. 17, 2010

(87) PCT Pub. No.: WO2009/110295
PCT Pub. Date: Sep. 11, 2009

(65) Prior Publication Data
US 2010/0318317 A1   Dec. 16, 2010

(30) Foreign Application Priority Data
Mar. 5, 2008 (JP) ................................. 2008-054448

(51) Int. Cl.
G01L 7/00 (2006.01)
(52) U.S. Cl.
USPC ................................. 702/140; 702/166; 73/52
(58) Field of Classification Search
USPC .................................................. 702/140, 166
See application file for complete search history.

(56) References Cited

FOREIGN PATENT DOCUMENTS

| JP | 63-302337 A | 12/1988 |
|---|---|---|
| JP | 5-38891 B2 | 6/1993 |
| JP | 7-55627 A | 3/1995 |
| JP | 8-219915 A | 8/1996 |
| JP | 11-304631 A | 11/1999 |
| JP | 2000266622 A | * 9/2000 |
| JP | 2005-172606 A | 6/2005 |
| JP | 2006-38826 A | 2/2006 |
| WO | WO 2007085499 A1 | * 8/2007 |

OTHER PUBLICATIONS

JP 2000266622 A—English Abstract.*
JP 2000266622 A—English Translation.*
International Search Report for the Application No. PCT/JP2009/052506 mailed Apr. 21, 2009.
International Preliminary Report on Patentability for Application No. PCT/JP2009/052506 mailed Oct. 21, 2010.

* cited by examiner

Primary Examiner — Jonathan C Teixeira Moffat
Assistant Examiner — Haihui Zhang
(74) Attorney, Agent, or Firm — Cheng Law Group, PLLC

(57) ABSTRACT

In order to judge the acceptability of internal pressure of a can accurately based on the displacement of the can, a pair of displacement sensors (2, 3) facing each other coaxially are arranged perpendicularly to the carrying direction of a carton case (C) such that the center of an encased can (K) being carried matches the center of the pair of displacement sensors (2, 3), measurement data of the displacement sensors (2, 3) is taken in at the timing that the center of the can (K) passes through the center of the pair of displacement sensors (2, 3), a total depth ($Ds = Dt + Db$) of a top depth ($Dt$) from the upper end of the can (K) to the open tab and a bottom depth ($Db$) from the lower end of the can (K) to the bottom panel is calculated, and then the calculation result is applied to a criterion for judging the acceptability of the total depth corresponding to the internal pressure of acceptable can.

12 Claims, 8 Drawing Sheets

CORRELATION BETWEEN
INTERNAL PRESSURE OF CAN AND BOTTOM DEPTH - TOP DEPTH

A

Db : BOTTOM DEPTH
Ku : LOWER END
Kb : BOTTOM PANEL
Lb

B

Dt : TOP DEPTH
Ku : UPPER END OF TOP PANEL
Kt : TAB
Lt

METHOD AND APPARATUS FOR INSPECTING INTERNAL PRESSURE OF CAN OF CANNED GOODS

TECHNICAL FIELD

The present invention relates to an internal pressure inspection method for a can of canned goods and an apparatus thereof, and more particularly to an internal pressure inspection method for a can of canned goods and an apparatus thereof which allow the internal pressure of the can of canned goods to be accurately judged on the basis of a displacement amount of the can of canned goods, regardless of the properties of the canned contents with respect to the cans on the inline immediately after being filled, and also regardless of the state of contact with the adjacent cans, of the state where the can is sunk into the inner surface of the bottom portion of a case, and of properties of the canned contents, with respect to the cans placed into the case.

BACKGROUND ART

Leak inspection of cans immediately after retort sterilization following filling and sealing is conducted with an inline tap tone inspection device disposed in the production line. Such leak inspection is conducted by inspecting the internal pressure of the can corresponding to an actual leak amount, rather than by directly measuring the actual leak amount of the can. Further, the internal pressure inspection of the can is conducted by measuring the peak frequency (resonance frequency) of the tap tone generated correspondingly to the internal pressure of the can, rather than by directly measuring the pressure inside the can. Thus, the leak inspection of the can is conducted by inspecting the tap tone of the can. However, when the defects are extremely small, such as pinholes, the amount of inflowing air is very small. Therefore, the change in the internal pressure is small immediately after the production. As a result, cans with such defects are not detected in the tap tone inspection and can be shipped as acceptable products. Accordingly, a method is used in which the tap tone inspection of the can is conducted after the cans are stored for several days before shipping. With such a method, because time is sufficiently secured for the external air to flow into the can even if the defects are pinholes, the internal pressure of the can rises sufficiently and this rise can be detected by tap tone inspection. It is noted that the cans are stored after they have been packed into carton cases. A case tap inspection device having heads whose arrangement matches an arrangement of cans is used to conduct tap inspection of the cans in this state. The case tap inspection device is suitable as a means for detecting the pinhole defects, but since it inspects the cans inside a carton case, the tap tone with a peak frequency corresponding to the internal pressure of the can possibly happen to be not generated because of contact with adjacent other cans. Further, a tap tone with a peak frequency corresponding to the internal pressure similarly cannot be obtained and acceptability of the internal pressure of the can cannot be judged when the can bottom (corresponds to a steel lid in a three-piece can) is strongly pressed against the internal surface of the bottom portion of the carton case. Thus, the problem associated with the leak inspection with a tap tone inspection device is that accurate inspection results cannot be obtained for certain states of cans inside the carton case.

Furthermore, when the contents contain a solid material or a high viscosity material, such contents adhere to the bottom of the can and therefore a tap tone with a peak frequency corresponding to the internal pressure of the can cannot be obtained. Depending on the amount of the adhesion, the tap tone itself is decreased and cannot be judged. In other words, the problem associated with the tap tone inspection method is that the acceptability of the internal pressure of the can cannot be accurately judged.

In order to inspect the cans that are placed inside a carton case, the case tap tone inspection device has tap tone inspection heads corresponding to the rows of cans and is capable of inspecting cans in a plurality of rows at the same time. The inspection timing is determined by detecting with a photoelectric switch the end of the carton case moving on a conveyor. The arrival of the can directly below the tap tone inspection head may be determined by counting output pulses of the encoder mounted on a roller shaft of the conveyor. At this time, a pulsed current flows in the coil portion of the tap tone inspection head, the can bottom is sucked in and released, and a tap tone is generated. The tap tone is collected by a microphone located inside the tap tone inspection head, amplified, filtered, and then converted into a digital signal with an A/D converter. The digital signal (waveform data) is processed to a fast Fourier transformation (FFT) by a microcomputer and a peak frequency of the tap tone is found. Since this peak frequency changes correspondingly to the internal pressure of the can, whether the internal pressure of the can is acceptable is judged by upper limit and lower limit frequency thresholds. Generally, in the cans with a negative pressure, the peak frequency of tap tone increases as the internal pressure of the can decreases. Therefore, if a lower limit threshold is set as a target with respect to the peak frequency corresponding to the internal pressure of can and a peak frequency of a can is inspected on the basis of the lower limit threshold so that cans with lower peak frequency than this threshold are rejected, it is possibly to reject the defective cans with increased internal pressure, that is, an opened orifice.

When a pinhole is opened in a can, bacteria or the like may come into the can through the pinhole within several days after the can has been manufactured and the contents of the can may rot. Rotten contents generate gas that is released inside the can, and the gas is accumulated inside the can when the pinhole opened in the can is very small or the pinhole is blocked by the rotten contents. When the release of gas is small, the internal pressure of the can rises. Therefore, this increase in internal pressure can be detected by the lower limit threshold of the peak frequency of tap tone.

However, when the can is under positive pressure, the peak frequency of the tap tone increases as the internal pressure of the can increases, by contrast with the case of negative pressure. Therefore, even if the pressure is initially negative, if rotting process advances and a large amount of gas is released inside the can, the internal pressure of the can changes from negative to positive. As a result, the peak frequency of the tap tone increases as the internal pressure of the can rises. Thus, in such a state that the internal pressure of the can is under a positive pressure, although the can is defective and a hole is opened therein, the peak frequency of the tap tone enters the acceptable range (equal to or above the lower limit threshold) due to increasing of the internal pressure of the can. As a result, the can is determined to be acceptable although the can is defective and has a hole. In other words, the case tap tone detector cannot effectively function for cans in which a pinhole is blocked by rotten contents, and such defective cans can be missed.

In order to prevent such a problem, the case tap tone detector is provided with a displacement sensor that measures the height of the can bottom, and the distance to the bottom (or lid) of the can that has arrived to a position immediately below the detector is measured. This approach is based on the assumption that in a can in which the internal pressure of the can has turned into a positive pressure due to the effect of gas produced by rotten contents, the can lid or bottom becomes convex due to the expansion. Therefore, when the distance to the can lid or can bottom is measured with the displacement sensor and the measured value is less than a fixed value (this indicates the convex state), the can is rejected as an expanded can even if the peak frequency of tap tone is normal.

As described above, the peak frequency of tap tone may change due to the effect of pressure applied to a can from the adjacent can during inspection. Further, as a result of stacking during storage, a can lid or can bottom may be strongly pressed against the inner surface of the bottom portion of the carton case, and when a recess appears in the carton case, the volume of sound emitted from the can may be insufficient during the tap tone inspection. When the recess appears in the carton case, the relative positions of the can and the displacement sensor shift from those in the normal case. As a result, the function of detecting an expanded can may not operate properly. In order to prevent the above-described inconvenience, an invention designed to reduce the effect produced by carton case on the tap tone is known (see, for example, Patent Document 1). This invention is based on the idea of blowing the air into a carton case having cans inside thereof and separating the carton case from the can lid or can bottom. This method effectively can reduces the effect produced by the carton case on the tap tone, but has demerits such as a high cost and decreased inspection speed since time is required to blow the air.

Further, when a can is filled with contents containing solids, such as corn potage soup, or contents of high viscosity, such as oshiruko (red-bean soup), these contents adhere to the can bottom, the effective weight of the panel portion is increased, and a frequency spectrum of the tap tone corresponding to the internal pressure of the can possibly cannot be obtained. Different from the effect produced by concavities of the carton case, this effect is difficult to reduce by blowing air.

An internal pressure inspection method for a can by which an amount of displacement of a central portion of the can lid from a predetermined reference position is measured with a (distance) sensor and whether the internal pressure of the can is acceptable is judged on the basis of this displacement amount has been known as an internal pressure inspection method for a can that does not rely on tap tone inspection (see, for example, the below-described Patent Documents 2 to 4); with this method the attention is focused on a concave-convex deformation of the can lid corresponding to the internal pressure of the can. According to the inventions disclosed in these patent documents, the central portion of the can lid is used as a displacement inspection point, and a seamed upper end portion (two-point average value) on both sides of the can lid that passes through the central portion and is parallel to the conveying direction, a seamed upper end portion (two-point average value) on both sides of the can lid that crosses the conveying direction, or an inner side (two-point average value) on the seamed upper end portion of the can lid is used as the reference position for displacement. In Patent Document 2, the seamed upper end portion on both sides of the can lid that crosses the conveying direction is used as a reference position for displacement in order to prevent a phenomenon according to which a displacement sensor pikes up not only a measurement signal of the seamed upper end portion that is an object, but also a measurement signal of the seamed upper end portion of the adjacent can that is not an object and the measurement accuracy at the seamed upper end portion that is an object decreases accordingly. Further, in Patent Document 3, the seamed upper end portion on both sides of the can lid that pass through the central portion of the can lid and is parallel to the conveying direction is set as a reference position for displacement and the amount of displacement of the central portion of the can lid from this reference position is compared with a preset threshold, whereby determining whether the internal pressure of the can is acceptable. Further, in Patent Document 4, a predetermined correction amount is added to the displacement amount of the leading can and the last can that is measured with the displacement sensor, whereby preventing an inconvenient event in which the measured displacement amounts of the leading can and the last can are undervalued lower than actual and the acceptable products are erroneously judged as defective products and rejected. Further, in Patent Documents 2 to 4, the cans are conveyed by a conveyor in a carton case. Therefore, the measurement signal transmitted by the displacement sensor onto the measurement object has to be capable of penetrating through the carton case. For this reason, an eddy current displacement sensor is used as the displacement sensor.

However, the measurement principle of the eddy current displacement sensor involves the operations of acting upon the measurement object with a high-frequency magnetic flux (magnetic field), inducing an eddy current in the surface of the measurement object (conductor), and using a mutual induction effect according to which the impedance (approximately equal to the induced reactance) of the displacement sensor (coil) itself is changed by the magnetic flux generated by the induced eddy current. Thus, the variation amount of the impedance strongly depends on the distance from the displacement sensor to the measurement object. Therefore, by picking up the displacement amount of the impedance as an electric signal, it is possible to find the distance from the sensor to the measurement object. Accordingly, the measurement object has to be positioned in a range of electromagnetic interference with the sensor and the (effective) area of the measurement object has to be sufficiently large for the magnetic flux to pass (permeate) therethrough. Therefore, a magnetic flux generated by the sensor cannot to pass in a sufficient amount through the measurement object region with a small thickness with respect to the radial direction, such as the seamed upper end portion of the can lid, that is, a region with a small cross-sectional area in the radial direction. As a result, it is thought that an accurate distance from the sensor to this region is difficult to obtain. Further, as described Patent Document 2, when three eddy current displacement sensors are disposed side by side in a row in the radial direction above the can lid and in this arrangement the central sensor measures a distance to the central portion of the lid can and the sensors on both sides measure the distance to the seamed upper end portions of the can lid at the same time, magnetic fluxes of the sensors interfere with each other. As a result, an accurate distance from each sensor to each measurement object region is similarly thought to be difficult to measure.

Patent Document 1: Japanese Patent Application Laid-open No. 2006-38826.
Patent Document 2: Japanese Patent Application Laid-open No. H8-219915.
Patent Document 3: Japanese Examined Patent Application No. H5-38891.
Patent Document 4: Japanese Patent Application Laid-open No. S63-302337.

DISCLOSURE OF THE INVENTION

Problems to be Solved by the Invention

As described hereinabove, the problem associated with an internal pressure inspection method for a can using an inline tap tone detector or case tap tone detector, that is, an internal pressure inspection method for a can by which the inspection is carried out on the basis of a peak frequency of a tap tone of the can, is that a peak frequency corresponding to the internal pressure of the can cannot be obtained when the can contents are a solid material or a high-viscosity material. Another problem is that when the cans are conveyed in a carton case, the intimate contact with the adjacent can and sinking of the can into the inner surface of the bottom portion of the carton case (concavity in the carton case) similarly make it impossible to obtain a peak frequency corresponding to the internal pressure of the can and whether or not the internal pressure of the can is acceptable, that is, whether the can leaks, cannot be accurately judged.

With the internal pressure inspection method by which the acceptability of the internal pressure of the can is judged on the basis of the displacement of the central portion of the can lid from the seamed upper end portion (reference position), rather than by the tap tone of the can, the displacement amount of the can lid is not affected by the state of the can contents, the intimate contact with the adjacent can, and sinking of the can into the inner surface of the bottom portion of the carton case, but when the displacement sensor is of an electromagnetic type, there inevitably arises the problem that the distance to the seamed upper end portion serving as a reference position is difficult to measure with good accuracy.

As in the above-described conventional technique, the displacement amount of the central portion of the can lid can be found by using a point on the inside from the seamed upper end portion, rather than the seamed upper end portion, as a reference position for displacement.

However, because the displacement amount of the central portion of the can in this case is much smaller than that in the case in which the reference position is the seamed upper end portion, whether the internal pressure of the can is acceptable is apparently difficult to determine accurately from the displacement amount of the can lid.

Accordingly, the present invention has been devised with the foregoing problems of the conventional technology in view and it is an object of the present invention to provide an internal pressure inspection method for a can that can accurately judge whether or not the internal pressure of encased cans is acceptable on the basis of the displacement amount of the cans, regardless of the state of contact with the adjacent other cans, sinking into the inner surface of the bottom portion of the case, and state of the can contents, and also to provide the device thereof.

Means for Solving the Problems

In order to attain the above-described object, the internal pressure inspection method for a can of canned goods according to claim 1 includes setting in advance a judgment criterion for total depth corresponding to an internal pressure of an acceptable can on the basis of correlation between a total depth (Ds) obtained by adding up a distance from an upper end to a top panel of the can and a distance from a lower end to a bottom panel of the can and an internal pressure of the can, calculating the total depth of the can for each can, and judging whether the internal pressure of the each can is acceptable on the basis of the judgment criterion for total depth.

It is widely known that, as mentioned hereinabove, as the internal pressure of the can decreases, the can lid (top panel) and bottom panel are pulled inward and therefore there exist respective correlations between a top depth (Dt) from the upper end of the can to the top panel and the internal pressure of can and between a bottom depth (Db) from the lower end of the can to the bottom panel and the internal pressure of the can. However, the inventors of the present application have found that a certain constant correlation also exists between the internal pressure of the can and a total depth (Ds) obtained by adding up these top depth (Dt) and bottom depth (Db), and that this correlation is stronger than the aforementioned correlations relating to the two depths.

However, these top depth (Dt) and bottom depth (Db) use the upper end and lower end (seamed upper end portion and lower end portion of the can) of the can as a reference position for displacement, respectively. In other words, when an electromagnetic sensor is used as a displacement sensor, these regions offer a very narrow magnetic permeation area (effective area for measurements) and therefore these regions are very difficult to measure directly and accurately with electromagnetic displacement sensors.

Accordingly, the inventors of the present application have devised a method (will be described below in greater detail) by which the total depth (Ds) is accurately sought by measuring with a displacement sensor only the distance to the top panel and bottom panel that have a sufficient effective area for measurements, without directly measuring the upper end and lower end of the can.

Furthermore, since the total depth (Ds) is measured with reference to both the upper end of the can and the lower end of the can, for example, when the cans sink into the inner surface of the bottom portion of the carton case and the position of the cans in the height direction (vertical direction) fluctuate, the total depth does not fluctuate. In addition, since the total depth is the so-called length (distance), the total depth is not affected by a contact state (intimate contact state) between the adjacent cans, sinking into the inner surface of the bottom portion of the case, and contents of the cans, as in the case of frequency spectrum in tap tone inspection.

Thus, in the present internal pressure inspection method for a can of canned goods, a judgment criterion for total depth corresponding to an internal pressure of an acceptable can is set in advance on the basis of correlation between a total depth (Ds) obtained by adding up the top depth (Dt) and the bottom depth (Db) and an internal pressure of the can, the total depth of each can that is being conveyed is sought, and the internal pressure of each can is inspected on the basis of the judgment criterion for total depth. As a result, whether or not the internal pressure of the can is acceptable may be accurately judged on the basis of the displacement amount of the can, regardless of the contact state of the adjacent cans, sinking of the cans into the carton case, and properties of the can contents.

In the internal pressure inspection method for a can according to claim 2, when a height (Hc) from the upper end to the lower end of the can is already known, a pair of displacement meters are installed opposite each other at a constant distance (Hp) from each other in an axial direction of the can, a distance (Lt) from one displacement meter to the top panel and a distance (Lb) from the other displacement meter to the bottom panel are individually measured, the total depth is sought by the formula $Ds=(Lt+Lb)-(Hp-Hc)$, and whether the internal pressure of each can is acceptable is judged on the basis of the judgment criterion for total depth.

With this internal pressure inspection method for a can of canned goods, by seeking the total depth from $Ds=(Lt+Lb)-(Hp-Hc)$, it is possible to seek accurately the total depth for which the upper end and lower end of the can are taken as displacement reference positions by using only data on the distance from displacement meters to the top panel and the bottom panel that have sufficient effective area for measurements. Therefore, the total depth may be accurately sought even when a displacement meter (displacement sensor) of an electromagnetic type is used.

Further, when the inverted can sinks through t (mm) into the inner surface of the bottom portion of the case and the aforementioned Lb changes as Lb→Lb+t, the aforementioned Lt conversely changes as Lt→Lt−t. In other words, since the total depth Ds is sought from Ds=(Lt+Lb)−(Hp−Hc), the total depth is not affected by changes of can position in the height direction (the change value t is automatically eliminated). Therefore, by applying the sought total depth to the judgment criterion for total depth, it is possible to judge accurately whether or not the internal pressure of the can is acceptable even when the can position fluctuates in the height direction.

In the internal pressure inspection method for a can of canned goods according to claim 3, the pair of displacement meters are installed so that axial centers of the meters coincide with each other.

With such internal pressure inspection method for a can of canned goods, since the pair of displacement meters are installed as described above, the distance (Lt) to the can lid (open tab) and the distance (Lb) to the bottom panel may be measured at the same timing.

In the internal pressure inspection method for a can of canned goods according to claim 4, measurement data of the displacement meters are picked up at a timing at which the axial centers (center) of the pair of displacement meters coincide with an axial center (center) of the can.

With such internal pressure inspection method for a can of canned goods, the distance to regions of the can lid and bottom panel with maximum displacement may be measured at the same timing. As a result, the total depth of the can that is being conveyed may be sought with good accuracy and whether the internal pressure of each can is acceptable may be accurately judged.

In the internal pressure inspection method for a can of canned goods, according to claim 5, when a lid and a bottom of the can are composed of mutually different metals, the can is disposed such that the lid or the bottom with a relatively low sensitivity with respect to the displacement meter is positioned on a lower side.

With such internal pressure inspection method for a can, when the can is disposed in the above-described manner, for example, when the can is placed in a case and conveyed, the can sinks into the bottom portion of the case under gravity. As a result, the region with a lower sensitivity with respect to the displacement meter becomes closer to the displacement meter and the distance data (Lt, Lb) may be obtained with better accuracy.

In order to attain the above-described object, an internal pressure inspection device for a can according to claim 6 includes: measurement means for measuring a total depth (Ds) obtained by adding up a distance from an upper end to a top panel of the can and a distance from a lower end to a bottom panel of the can; and a judgment criterion for total depth established on a basis of correlation between the total depth and an internal pressure of the can, wherein the total depth of each can is sought individually and whether the internal pressure of each can is acceptable is judged on the basis of the judgment criterion for total depth.

With such internal pressure inspection device for a can of canned goods, the internal pressure inspection method for a can of canned goods according to claim 1 may be advantageously implemented.

In the internal pressure inspection device for a can of canned goods according to claim 7, a pair of displacement meters disposed opposite each other at a constant distance (Hp) from each other in an axial direction (height direction) of the can are provided, wherein when a height (Hc) from the upper end to the lower end of the can is already known, a distance (Lt) from one displacement meter to the top panel and a distance (Lb) from the other displacement meter to the bottom panel are individually measured, the total depth (Ds) is found by the formula Ds=(Lt+Lb)−(Hp−Hc), and whether or not the internal pressure of each can is acceptable is judged on the basis of the judgment criterion for total depth.

With such internal pressure inspection device for a can of canned goods, the internal pressure inspection method for a can of canned goods according to claim 2 may be advantageously implemented.

In the internal pressure inspection device for a can of canned goods according to claim 8, the pair of displacement meters are installed so that axial centers of the meters coincide with each other.

With such internal pressure inspection device for a can of canned goods, the internal pressure inspection method for a can of canned goods according to claim 3 may be advantageously implemented.

The internal pressure inspection device for a can of canned goods according to claim 9 includes a guide rail that guides the can that is being conveyed so that the axial centers (center) of the pair of displacement meters coincide with the axial center (center) of the can.

With such internal pressure inspection device for a can of canned goods, the internal pressure inspection method for a can of canned goods according to claim 4 may be advantageously implemented.

In the internal pressure inspection device for a can of canned goods according to claim 10, when a lid and a bottom of the can are composed of mutually different metals, the can is disposed such that the lid or the bottom with a relatively low sensitivity with respect to the displacement meter is positioned on a lower side.

With such internal pressure inspection device for a can of canned goods, the internal pressure inspection method for a can of canned goods according to claim 5 may be advantageously implemented.

Effect of the Invention

With the internal pressure inspection method for a can of canned goods in accordance with the present invention, for the cans on the line immediately after being filled, whether or not the internal pressure of the can is acceptable may be accurately judged on the basis of the displacement amount of the can regardless of the properties of contents. On the other hand, for the cans placed into a case, whether or not the internal pressure of the can is acceptable may be also accurately judged on the basis of the displacement amount of the can regardless of the state of contact with the adjacent cans, sinking into the inner surface of the bottom portion of the case, and properties of the can contents. Thus, the internal pressure of the can may be inspected by applying the total depth (Ds) obtained by adding up the distance from the upper end of the can to the top panel to the distance from the lower end of the can to the bottom panel to a judgment criterion for total depth established on the basis of correlation between the internal pressure of the can and the total depth (Ds).

Further, a method for seeking the total depth (Ds) in accordance with the present invention is configured such that even if fluctuation occurs in the height direction of the can, the fluctuation component in the height direction is canceled.

Further, similarly to the conventional internal pressure inspection method for a can of canned goods that is based on the amount of displacement, the seamed portions (upper end, lower end) of each can are taken as reference positions for the amount of displacement in seeking the distance from the upper end of the can to the top panel and the distance from the lower end of the can to the bottom panel. However, the method in accordance with the present invention is configured such that the displacement meter (sensor) actually measures the distance (Lt) to the top panel with a large effective area and the distance (Lb) to the bottom panel that also has a large effective area and the total depth (Ds) may be sought by using only these distances. In addition, in the conventional internal pressure inspection method for a can that is based on the amount of displacement, the amount of displacement that is measured is a distance from the upper end of the can to the top panel, whereas in the present invention, a value obtained by adding the distance (Db) from the lower end of the can to the bottom panel to the aforementioned distance is taken as the amount of displacement (=total depth (Ds)) corresponding to the internal pressure of the can. Therefore, the amount of displacement to be measured is larger than that in the conventional internal pressure inspection method for a can of canned goods that is based on the amount of displacement. As a result, the amount of displacement (=total depth (Ds)) corresponding to the internal pressure of the can may be measured with good accuracy.

As a result, the present invention may advantageously resolve the problems of the conventional internal pressure inspection method on the basis of a tap tone (a peak frequency): impossibility of obtaining a tap tone at a peak frequency corresponding to the internal pressure of the can when the contents of the can is a solid matter or a high-viscosity matter and a problem associated with a similar impossibility of obtaining a peak frequency corresponding to the internal pressure of the can when the can is in intimate contact with the adjacent can or when the can sinks into the inner surface of the bottom portion of the carton case (a state of sinking into the carton case). The present invention can also advantageously resolve the problem of the conventional internal inspection method on the basis of the amount of displacement: difficulty of measuring accurately the distance to the upper end portion of the seamed section that serves as a reference position when the displacement sensor is of an electromagnetic type. Therefore, with the internal pressure inspection method for a can of canned goods in accordance with the present invention, whether or not the internal pressure of the can is acceptable can be judged accurately, regardless of whether or not the can has been placed into the case and also regardless of the properties of the can contents.

The internal pressure inspection apparatus in accordance with the present invention may implement advantageously the internal pressure inspection method for a can in accordance with the present invention and also may be produced at a low cost because the structure thereof is simpler than that of the tap tone inspection device.

Figure 1:
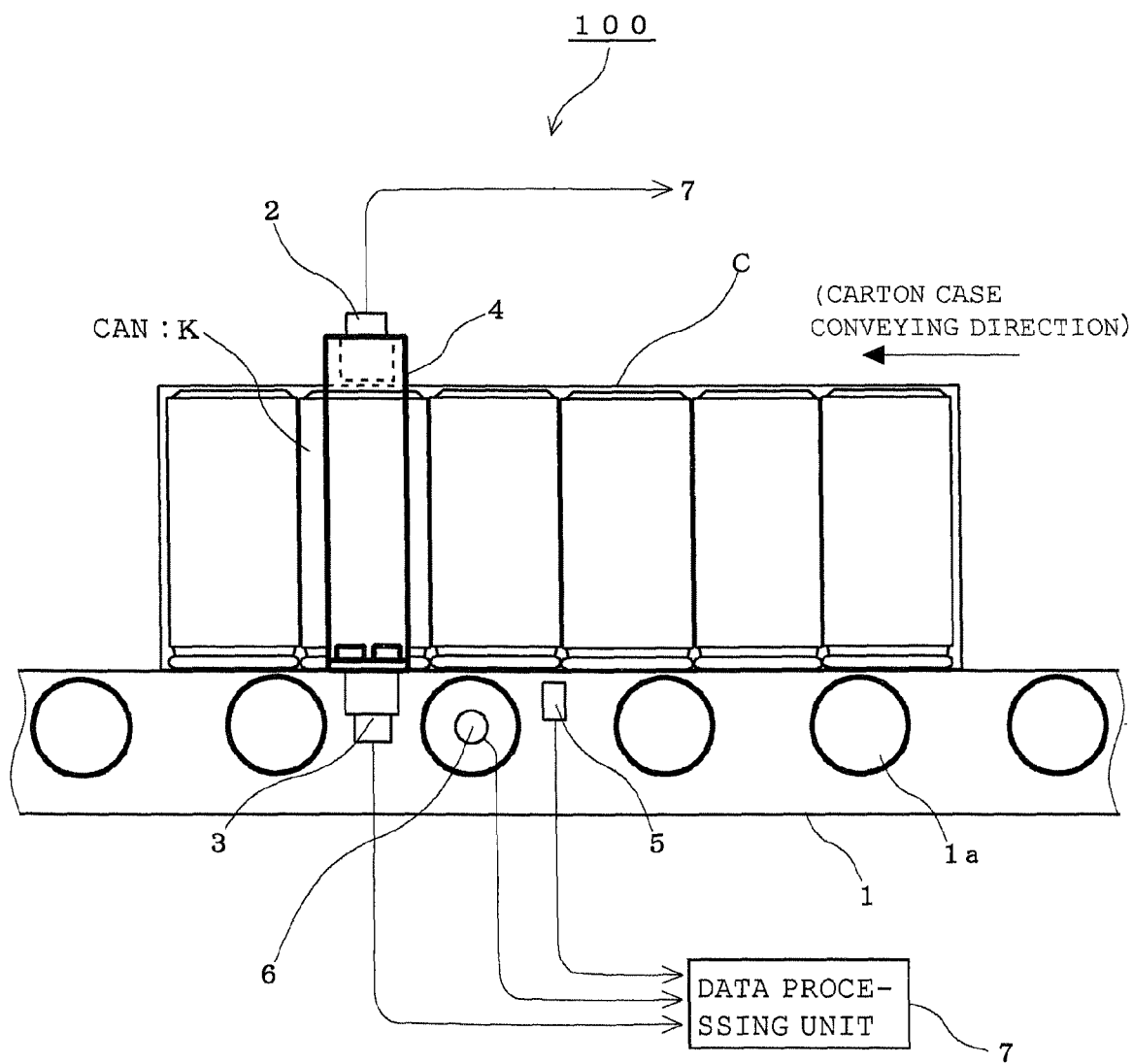
FIG. 1 is an explanatory drawing illustrating an internal pressure inspection device for a cased can of canned goods in accordance with the present invention.

EXPLANATION OF REFERENCE SYMBOLS 1 roller conveyor
2 first displacement sensor
3 second displacement sensor
4 displacement sensor mounting bracket
5 photoelectric switch
6 rotary encoder
7 data processing unit
8 side guide (right)
9 side guide (left)
10 rejection chute
11 air cylinder
12 rejection pusher
100, 200 internal pressure inspection device for a cased can of canned goods
300 internal pressure inspection device for a can of canned goods.

BEST MODE FOR CARRYING OUT THE INVENTION

The present invention will be described below in greater detail on the basis of embodiments thereof illustrated by the drawings.

FIG. 1 is an explanatory drawing illustrating an internal pressure inspection device 100 for a cased can of canned goods in accordance with the present invention. For the sake of convenience of explanation, a carton case C and a roller conveyor 1 are shown such that the inside thereof may be viewed.

The internal pressure inspection device 100 for a cased can of canned goods is constituted by the roller conveyor 1 conveying the carton case C to a predetermined position, a first displacement sensor 2 measuring a distance to a bottom panel of a can K of canned goods, a second displacement sensor 3 measuring a distance to a tab of the can K, a displacement sensor mounting bracket 4 that fixes a plurality of displacement sensors, a photoelectric switch 5 that detects a carton case end, a rotary encoder 6 outputting a pulse signal corresponding to a revolution angle of a roller, and a data processing unit 7 that takes in measurement data of the first displacement sensor 2 and the second displacement sensor 3 and executes a predetermined processing. As will be described below in greater detail with reference to FIG. 3 to FIG. 8, the internal pressure inspection device 100 for a cased can of canned goods takes in measurement data of the first displacement sensor 2 and the second displacement sensor 3 at a timing at which the axial center of each can K located within the carton case C passes thorough the axial center of a pair of displacement sensors 2, 3 and the device 100 calculates a total depth (Ds) of each can K (a value obtained by adding up a top depth (Dt) from the upper end of the can K to the tab and a bottom depth (Db) from the lower end of the can to the bottom panel), and applies the calculation results to an acceptable product judgment criterion (judgment criterion for total depth) corresponding to the internal pressure in an acceptable can, a part of the correlation data of the internal pressure of the can and the total depth value (Ds) (data representing a correlation of the internal pressure of the can and the total depth), examines accurately the internal pressure of each can K in the case, and judges accurately whether the internal pressure of each can is acceptable.

Figure 2:
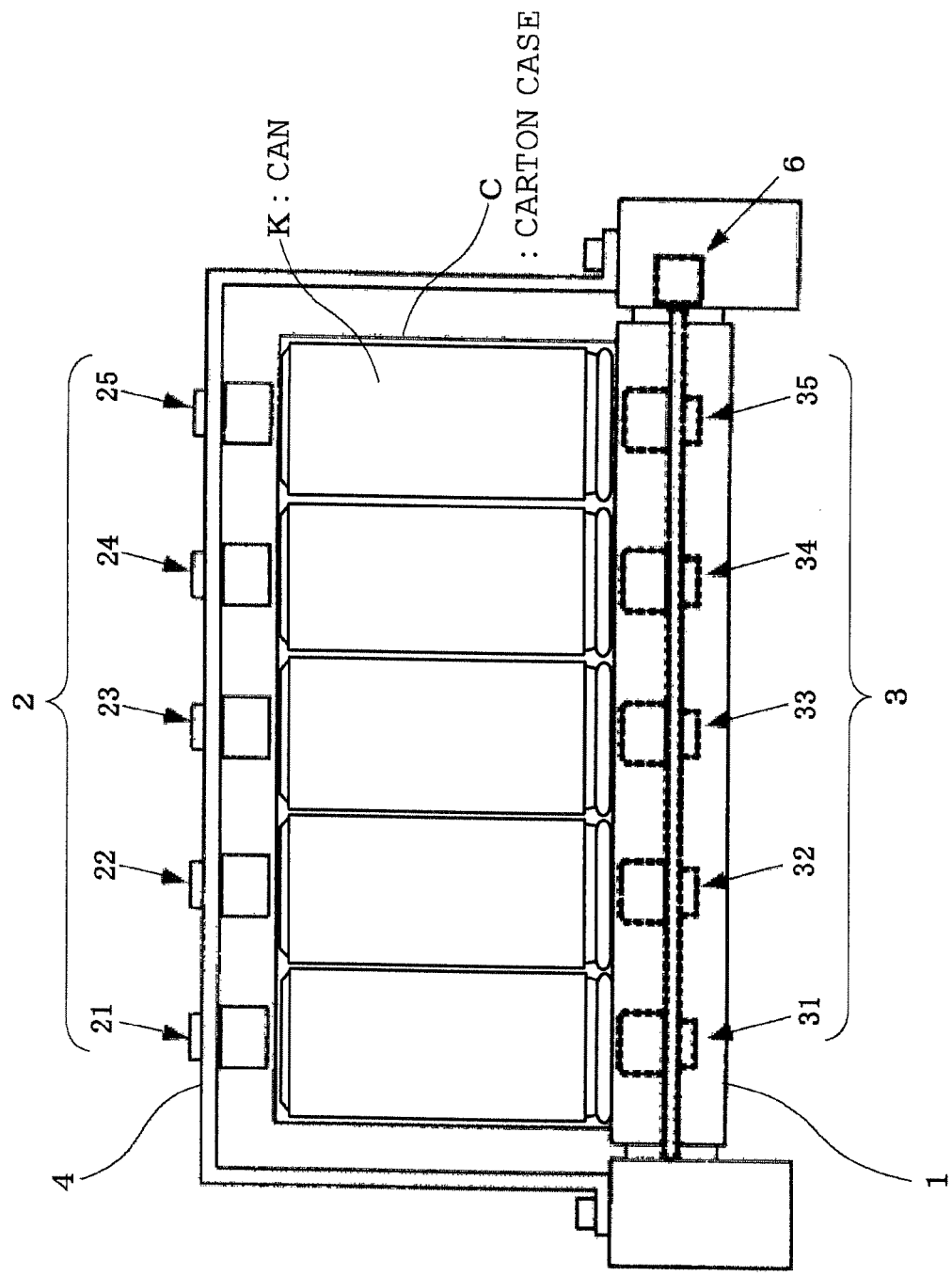
FIG. 2 is an explanatory drawing illustrating an internal pressure inspection device for a cased can of canned goods can in accordance with the present invention.

The first displacement sensor 2 and the second displacement sensor 3 constitute a pair in a state in which they are at a certain distance apart and face each other. The first displacement sensors 2 are equally spaced mounted on the displacement sensor mounting bracket 4, and the second displacement sensors 3 are equally spaced mounted between rollers 1a, 1a of the roller conveyor 1. For the sake of drawing convenience, only a pair of sensors is shown in the figure, but actually, as shown in FIG. 2, for example, five pairs (={(2 k, 3 k)|k=1, . . . , 5}) are disposed at even intervals in the direction perpendicular to the conveying direction.

Further, the first displacement sensor 2 and the second displacement sensor 3 are disposed coaxially and so arranged that the center of the pair of displacement sensors 2, 3 may coincide with the center of the can K that is being conveyed. Further, the first displacement sensor 2 is disposed at the displacement sensor mounting bracket 4 at a distance of, for example, about 1.0 mm from the upper surface of the carton case C so as to avoid contact with the carton case C. Therefore, the spacing of these displacement sensors is adjusted to a predetermined distance correspondingly to the thickness of the carton case C.

When the measurement object is composed of aluminum, the first displacement sensor 2 and the second displacement sensor 3 are calibrated by aluminum. On the other hand, when the measurement object is composed of steel, the calibration is performed by steel. In the present embodiment, the lid of the can K is composed of aluminum. Therefore, the second displacement sensor 3 is calibrated by aluminum. By contrast, the can bottom is composed of steel and the first displacement sensor 2 is calibrated by steel. The adjustment is thus made to obtain a sufficient sensitivity with respect to the measurement object.

When the displacement sensor is of an eddy current type, magnetic susceptibility of aluminum is lower than that of steel. Therefore, since sensitivity of the displacement sensor to aluminum is somewhat lower than to steel, when the measurement object is composed of aluminum, it is preferred that the posture of the can K be set such that the measurement object is close to the displacement sensor. In the present embodiment, since the lid of the can K is composed of aluminum, the carton case C is placed on the roller conveyor 1 and conveyed so that the lid of the can K is on the lower side (the bottom is on the top side).

The timing at which the data processing unit 7 takes in (inspects) the measurement data from the pair of displacement sensors 2, 3 is a timing at which the center of these displacement sensors 2, 3 coincides with the center of the can K. The inspection timing for each can may be obtained, for example, by counting (with the data processing unit 7) pulse signals (correspond to the revolution angle) outputted by a rotary encoder 6 installed at the drive shaft of the roller conveyor 1. The inspection start timing may be obtained by detecting a carton case end with a photoelectric switch 5 and counting pulse signals outputted by the rotary encoder 6 by taking the detected signal as a trigger. More specifically, the data processing unit 7 starts counting the pulse signals of the rotary encoder 6 when the carton case C blocks the light of the photoelectric switch 5 after being placed on the roller conveyor 1. The data processing unit 7 takes in signals of all of the displacement sensors at a timing at which a can of each row in the carton case comes directly below a pair of displacement sensors. The data processing unit 7 is provided with an A/D converter and converts the signals of the displacement sensors into digital data. As described hereinabove, since the displacement sensors are calibrated correspondingly to the material of the measurement object, the data may be easily converted into a distance.

Figure 3:
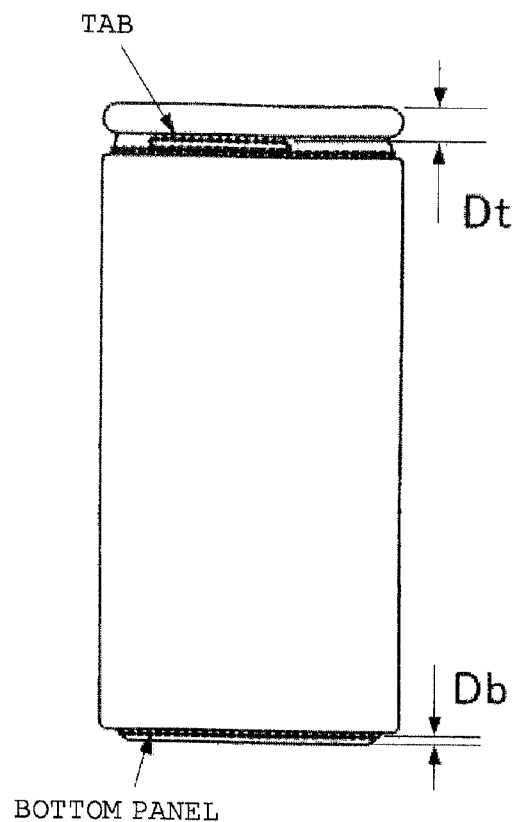
FIG. 3 is an explanatory drawing illustrating a side view of the can of canned goods.

FIG. 3 is an explanatory drawing illustrating the side view of the can.

Figure 4:
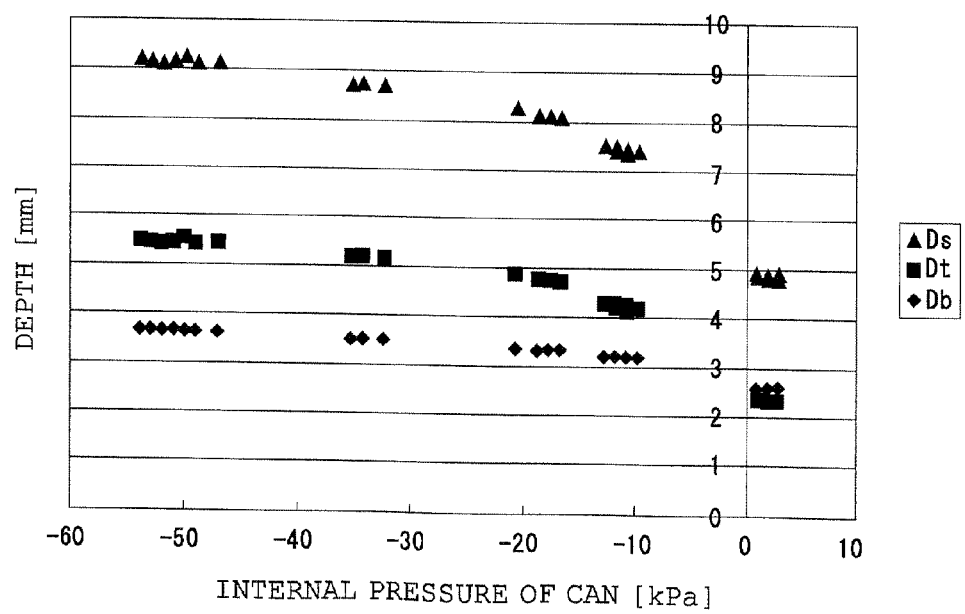
FIG. 4 is a graph illustrating the correlation between the internal pressure and depth (top depth, bottom depth, total depth) of the can of canned goods.

An aluminum lid is seamed upon the upper side of the can. The depth from the upper end of the can to the lid surface is denoted by Dt (top depth). In the case of a beverage can, a tab is attached to the aluminum lid. Therefore, the top depth in this case is the distance from the upper end of the top panel to the tab. The depth from the lower end of the can to the bottom panel is denoted by Db (bottom depth). In the case of a three-piece can, a steel lid is seamed upon the bottom of the can and therefore, the aforementioned depth is a depth to the lid panel.

Where Dt and Db of cans with different internal pressures are measured, a graph (correlation between the internal pressure of a can and bottom depth–top depth) shown in FIG. 4 is obtained. As the internal pressure of the can decreases, the can lid and bottom panel are pulled inside the can and therefore the values of Dt and Db increase. Since the bottom side is from steel, the variation amount of the bottom is small, but the value thereof increases correspondingly to the internal pressure.

The internal pressure of the can apparently may be sought by measuring the top depth Dt or bottom depth Db. However, when the can is accommodated in a carton case, the vertical position of the can changes depending on the position inside the carton case (whether in the center or at the end of the case) or a degree to which the can sinks into the carton case and therefore, the measurement data have a large range of error.

A sum (=total depth Ds) of the top depth Dt and bottom depth Db will be considered below. The graph in FIG. 4 shows that the variation in total depth Ds caused by internal pressure is larger than that of either of the top depth Dt and bottom depth Db and more suitable for inspecting the internal pressure of cans. Therefore, in the present embodiment, the internal pressure of cans is inspected and the presence of leak is judged (it is judged whether or not the can is of acceptable can) by measuring the total depth Ds.

Figure 5:
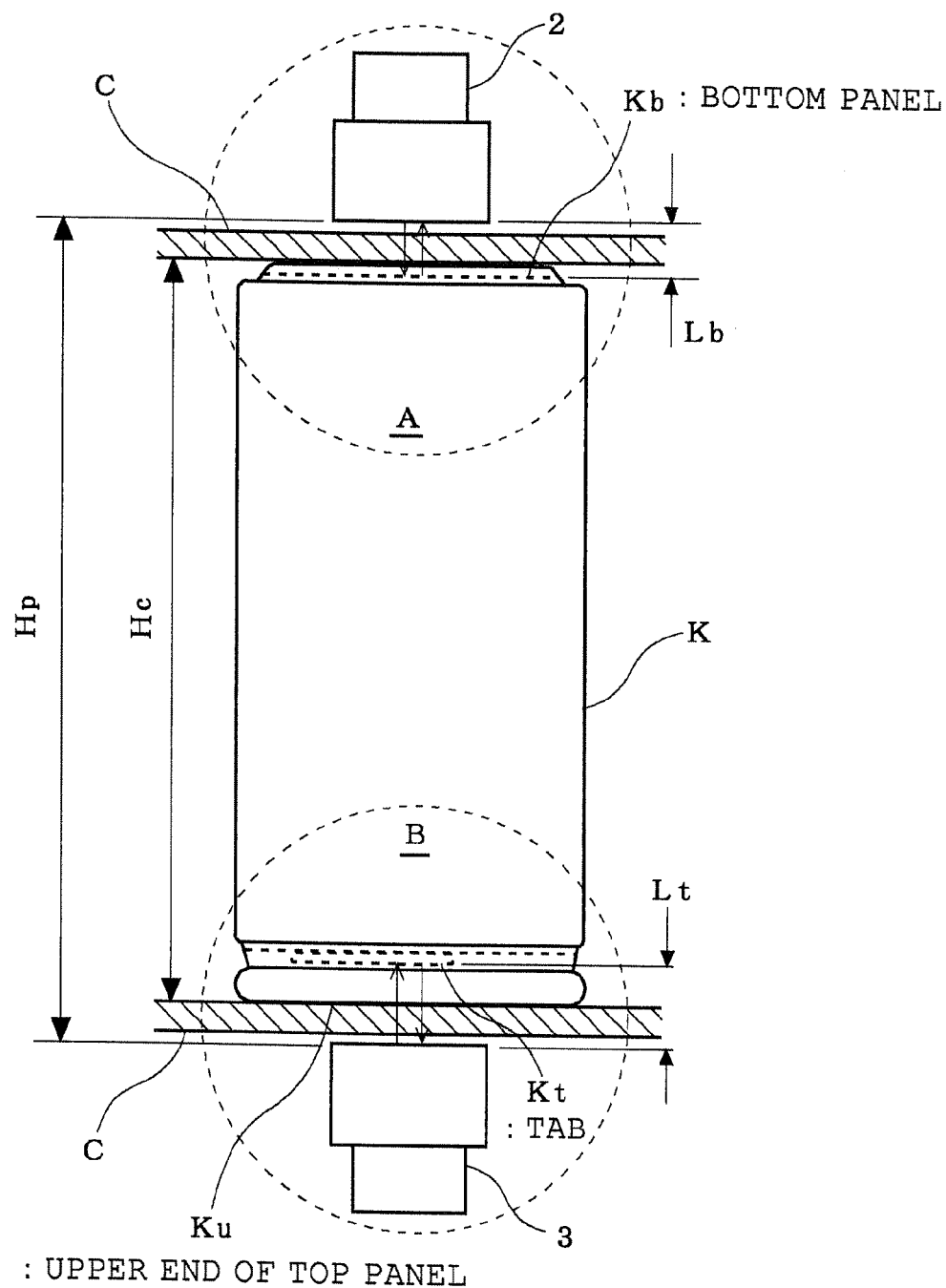
FIG. 5 is an explanatory drawing illustrating the measurement principle relating to the internal pressure inspection method for a cased of canned goods in accordance with the present invention.
Figure 6:
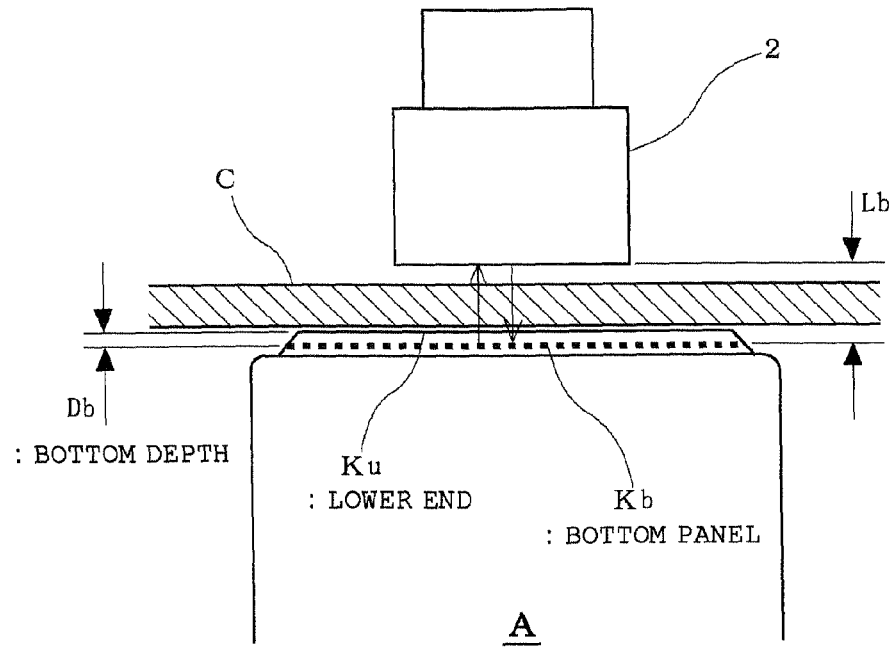
FIG. 6 is an explanatory drawing illustrating an A portion shown in FIG. 5.
Figure 7:
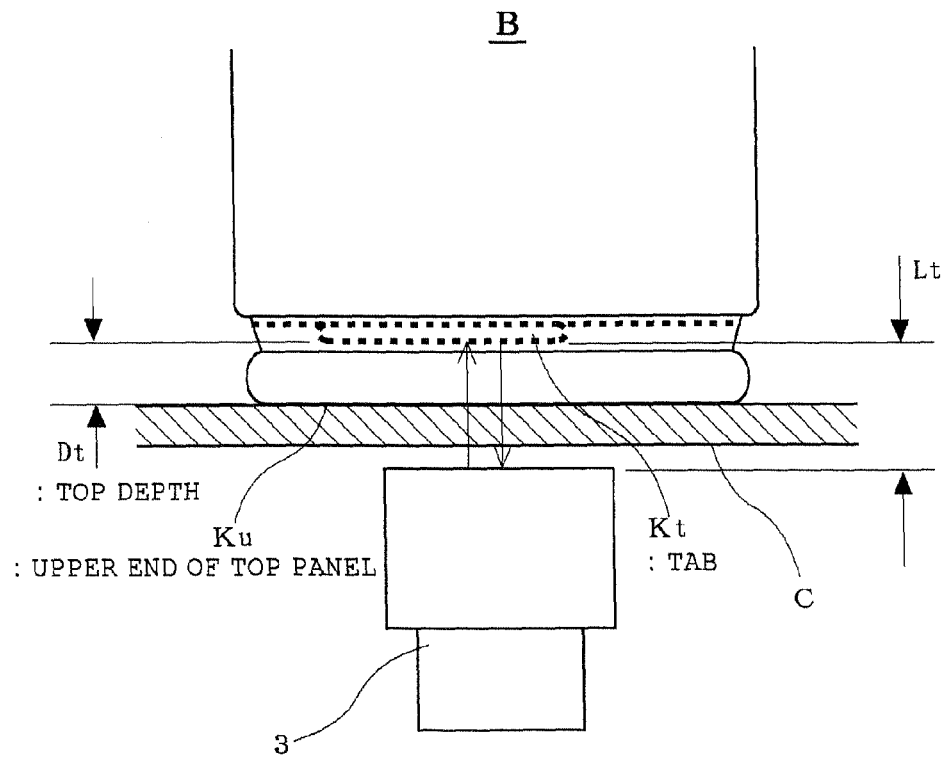
FIG. 7 is an explanatory drawing illustrating a B portion shown in FIG. 5.

A measurement system relating to the internal pressure inspection method for a cased can of canned goods in accordance with the present invention is shown in FIG. 5 to FIG. 7. In the figures, this measurement system is specifically shown on the basis of the pair of displacement sensors 2, 3 in FIG. 1. The pair of upper and lower displacement sensors 2, 3, (for example, of eddy current system) is placed in a zone where cans cased in the carton case C pass. In this case the stand direction of the moving can K is determined in advance, and the pair of displacement sensors 2, 3 corresponding to the materials used is disposed in opposite positions determined by the materials (aluminum lid or steel bottom). The center of this pair of displacement sensors 2, 3 is on a line the center of can K passes, and where the measurement data of the displacement sensors are taken in at a timing at which the center of the can K coincides with the center of the pair of displacement sensors, it is possible to take in the respective distances Lt, Lb. The spacing Hp of the pair of displacement sensors 2, 3 is a constant value determined by a can shape.

The contents of dimensions in FIG. 5 to FIG. 7 are described below.

Hp: spacing of the pair of displacement sensors 2, 3
Hc: height of the can K
Lt: distance from the tab Kt to the second displacement sensor 3
Lb: distance from the bottom panel Kb to the first displacement sensor 2

Where the measurements are conducted in this state, the total depth Ds, which is a sum total of the top depth Dt and the bottom depth Db, will be Ds=Dt+Db=(Lt+Lb)−(Hp−Hc).

Now, let us assume that the state (sinking degree) of the carton case C changes and the can K sinks into the bottom portion of the carton case through t (mm) (the position assumed to move down through t (mm)). The value of the total depth Dst in this case may be sought as follows.

$$Dst=((Lt-t)+(Lb+t))-(Hp-Hc)=(Lt+Lb)-(Hp-Hc)=Ds.$$

Thus, even if the position of the can in the height direction has changed under the effect of carton case C or the like, the value of the total depth Ds in principle does not change and therefore, accurate measurements of total depth are conducted.

Further, since the actual measurement points of the displacement sensors are the top panel and the bottom panel that have a sufficient measurement area, accurate measurements of total depth are conducted even when the displacement sensors are of an eddy current system.

Figure 8:
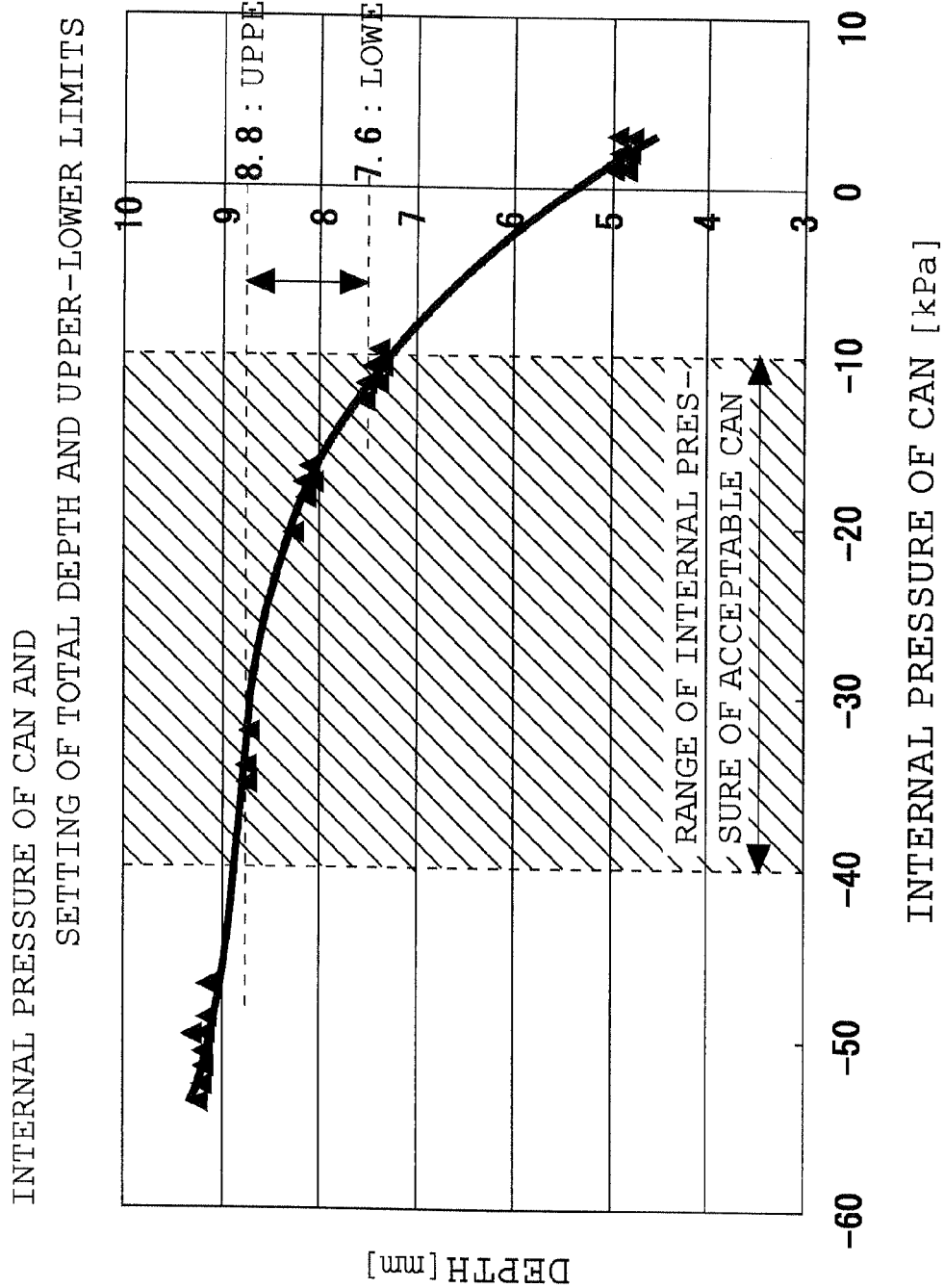
FIG. 8 is a graph illustrating an example of acceptable product judgment criterion for a cased can of canned goods.

FIG. 8 is a graph showing an example of acceptable product judgment criterion for a cased can.

Where the internal pressure range of the acceptable can is from −10 kPa to −40 kPa, the range (acceptable quality determination criterion) of total depth Ds corresponding thereto is from 7.6 mm (lower limit) to 8.8 mm (upper limit) as follows from the graph shown in FIG. 8. Where these values are inputted as upper and lower limit settings in the inspection device and the products outside this range (cans in which the total depth is outside this range) are rejected, the defective products may be removed.

The upper limit value and lower limit value of the acceptable product judgment criterion of the cased cans of canned goods are stored as data in the data processing device 7, and the data processing device 7 takes in the measurement data from the displacement sensors 2, 3 at a timing at which the center of the can K coincides with the center of the pair of displacement sensors 2, 3 and then calculates the total depth Ds for each can K on the basis of these measurement data. The calculated total depth Ds is applied to the acceptable product judgment criterion to inspect the internal pressure of the cased can and judge whether or not a leak is present.

Further, in this method, sound is not the judgment object as in the tap tone inspection. Therefore, whether or not a leak is present in the cased can K may be accurately judged, regardless of the contact degree of the can K and the carton case C or the viscosity and presence of solid matter in the contents.

Embodiment 1

Figure 9:
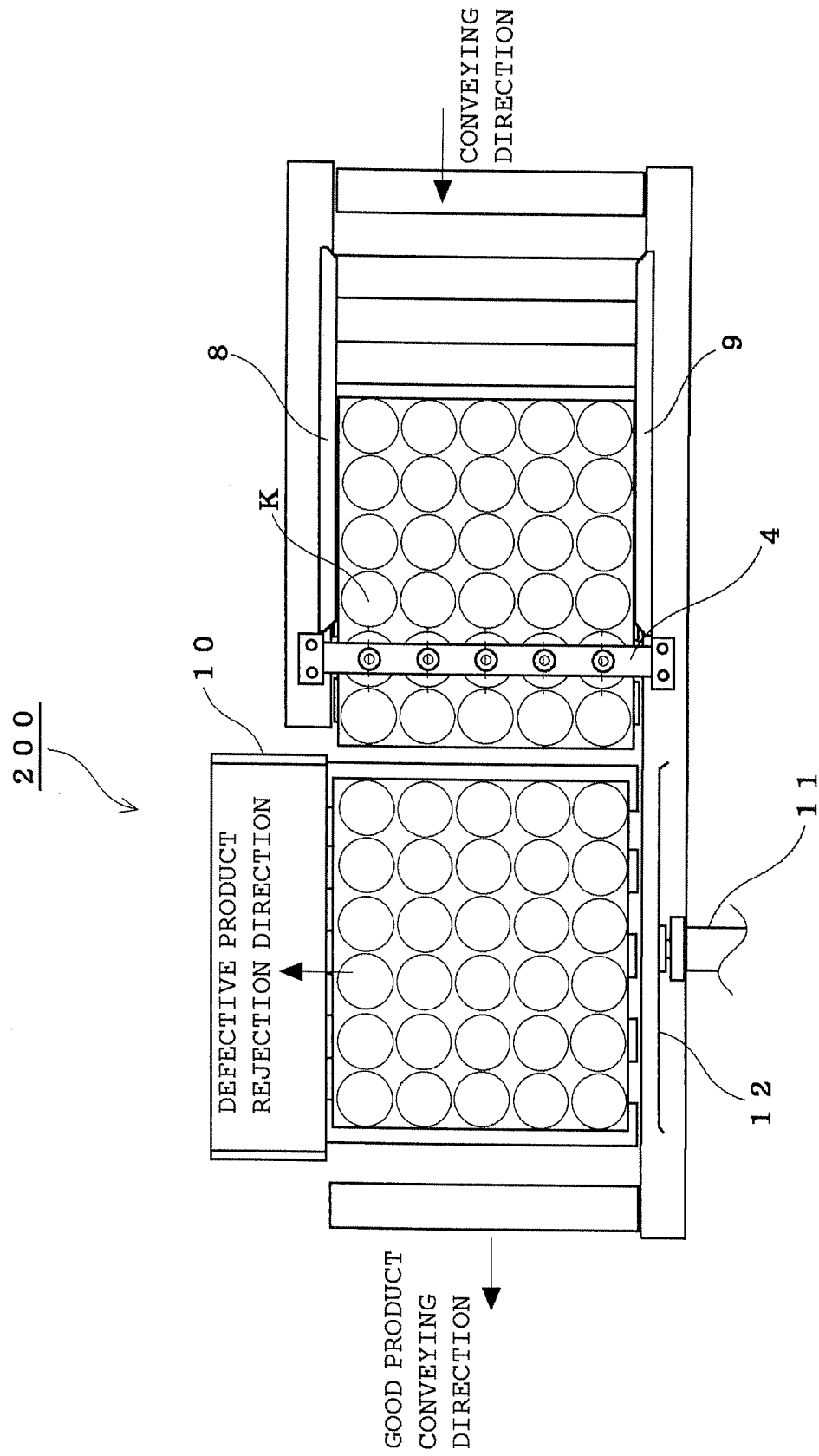
FIG. 9 is an explanatory drawing illustrating an internal pressure inspection device for a cased can of canned goods according to Embodiment 1.

FIG. 9 is an explanatory drawing illustrating an internal pressure inspection device 200 for a cased can of canned goods according to Embodiment 1.

The common feature of the internal pressure inspection device 200 for a cased can and the above-described internal pressure inspection device 100 for a cased can is that the total depth Ds of the cased can that is being conveyed is sought by the pair of displacement sensors 2, 3, the total depth Ds is applied to the acceptable product judgment criterion (correlation between the internal pressure of the can and the total depth) shown in FIG. 8, the internal pressure of each cased can is inspected, and the acceptability of the internal pressure of the can is accurately judged.

However, in the internal pressure inspection device 200 for a cased can, side guides 8, 9 (guide rails) are provided with a part of roller conveyor into which the carton case C is introduced and the device is thus configured such that lateral displacement in the introduction is restricted and the center of the can K reliably arrives at the center of the pair of displacement sensors. The inspected carton case C is further fed to the left. A case including a defective product is fed to a rejection chute 10 by a rejection pusher 12 driven by an air cylinder 11 to separate from acceptable products. The acceptable products are further conveyed to the subsequent process.

Embodiment 2

Figure 10:
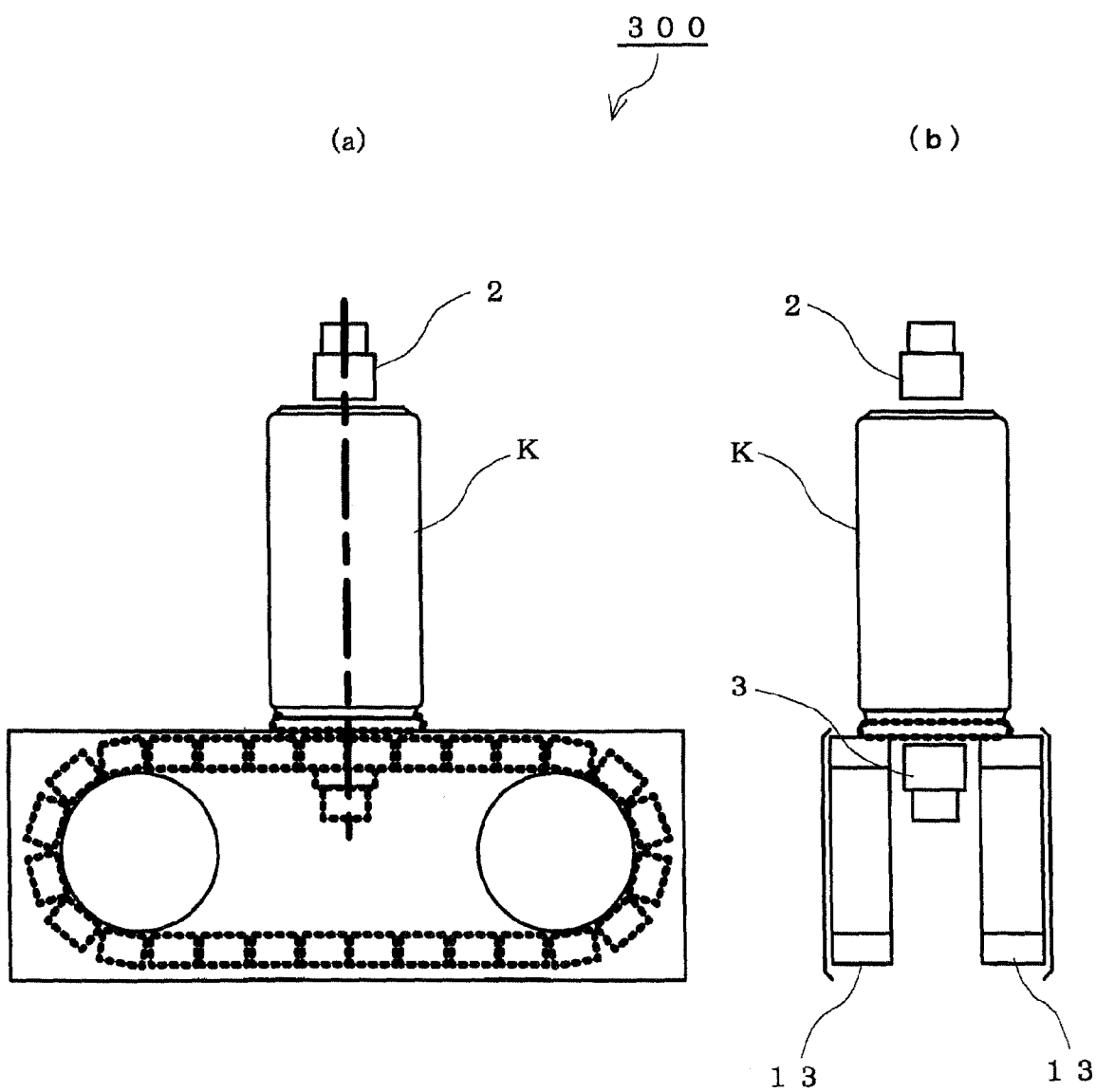
FIG. 10 is an explanatory drawing illustrating an internal pressure inspection device for a can of canned goods according to Embodiment 2.

FIG. 10 is a principal explanatory drawing illustrating an internal pressure inspection device 300 for a can of canned goods according to Embodiment 2. FIG. 10(a) is a front view, and FIG. 10(b) is a right side view.

The internal pressure inspection device 300 for a can of canned goods has a configuration in which two chain conveyors 13, 13 with a distance therebetween being less than the outer diameter of can K are arranged in parallel and a pair of displacement sensors 2, 3 is provided between these conveyors (sensors other than the pair of displacement sensors 2, 3, a data processing device, and displacement sensor fixing means are omitted). Whether or not the internal pressure of a can is acceptable is judged by seeking the total depth Ds of the can K with the pair of displacement sensors 2, 3 in the same manner as in the above-described internal pressure inspection devices 100, 200 for a cased can and applying the sought total depth Ds to the acceptable product judgment criterion shown in FIG. 8. Therefore, the internal pressure inspection device 300 for a can of canned goods may be used as an inline inspection device for a can that inspects the internal pressure of individual can of canned goods, for example, the can immediately after subjected to retort sterilization after filled with contents and sealed.

Embodiment 3

In the above-described embodiments, the can K is a negative-pressure can, but the present invention is not limiting to such a can of canned goods and, as shown in FIG. 4, is capable of be advantageously applied to a can that has a certain constant correlation between the internal pressure of the can and the total depth.

Embodiment 4

In the above-described embodiments, the cans K are placed into the carton case C and conveyed by the roller conveyor 1, and the top depth Dt and bottom depth Db are measured with the pair of displacement sensors 2 and 3, respectively. However, such a configuration is not limiting, and the cans K may be directly conveyed by the roller conveyor 1. In this case, contactless sensors such as electromagnetic, optical, and acoustic sensors may be used as the displacement sensors.

INDUSTRIAL APPLICABILITY

The internal pressure inspection method for a can of canned goods in accordance with the present invention and a device thereof may be advantageously applied to a process of accurately inspecting the internal pressure of a can of canned goods.

The invention claimed is:

1. An internal pressure inspection method for a can of canned goods, with a pair of displacement meters being disposed above and below a conveyance line of said can so as to be opposite each other at a constant distance (Hp) in a height direction, the method being characterized in that a distance (Lt) from one displacement meter to a top panel of said can and a distance (Lb) from the other displacement meter to a bottom panel of the can are individually measured, a total depth is sought by the formula Ds=(Lt+Lb)−(Hp−Hc) by a data processing unit from said respective measurement values, a can height (Hc) having a predefined value, and a distance (Hp) between said pair of displacement meters, and the acceptability of the internal pressure of each can is judged on the basis of a judgment criterion for total depth preset.

2. The internal pressure inspection method for a can of canned goods according to claim 1, wherein the pair of displacement meters is installed so that axial centers of the meters coincide with each other.

3. The internal pressure inspection method for a can of canned goods according to claim 2, wherein measurement data of the displacement meters are taken in at a timing at which the axial centers of the pair of displacement meters coincide with the axial center of the can.

4. The internal pressure inspection method for a can of canned goods according to claim 1, wherein when a lid and a bottom of the can are composed of mutually different metals, the can is disposed such that the lid or the bottom with a relatively low sensitivity with respect to the displacement meter is positioned on a lower side.

5. An internal pressure inspection apparatus for a can of canned goods, with a pair of displacement meters being disposed above and below a conveyance line of said can so as to be opposite each other at a constant distance (Hp) in a can height direction, comprising:

measuring means for individually measuring a distance from one displacement meter to a top panel and a distance from the other displacement meter to a bottom panel, calculating means for determining a total depth from said respective measurement values, a can height having a predefined value, and a distance between said pair of displacement meters and a data processing unit into which a judgment criterion for total depth established on the basis of correlation between said total depth and said internal pressure of the can is input.

6. The internal pressure inspection apparatus for a can of canned goods according to claim 5, wherein the pair of displacement meters are installed so that axial centers of the meters coincide with each other.

7. The internal pressure inspection apparatus for a can of canned goods according to claim 6, comprising:

a guide rail that guides the can that is being conveyed so that the axial centers of the pair of displacement meters coincide with the axial center of the can.

8. The internal pressure inspection apparatus for a can of canned goods according, to claim 5, wherein when a lid and a bottom of the can are composed of mutually different metals, the can is disposed such that the lid or the bottom with a relatively low sensitivity with respect to the displacement meter is positioned on a lower side.

9. The internal pressure inspection method for a can of canned goods according to claim 2, wherein when a lid and a bottom of the can are composed of mutually different metals, the can is disposed such that the lid or the bottom with a relatively low sensitivity with respect to the displacement meter is positioned on a lower side.

10. The internal pressure inspection method for a can of canned goods according to claim 3, wherein when a lid and a bottom of the can are composed of mutually different metals, the can is disposed such that the lid or the bottom with a relatively low sensitivity with respect to the displacement meter is positioned on a lower side.

11. The internal pressure inspection apparatus for a can of canned goods according to claim 6, wherein when a lid and a bottom of the can are composed of mutually different metals, the can is disposed such that the lid or the bottom with a relatively low sensitivity with respect to the displacement meter is positioned on a tower side.

12. The internal pressure inspection apparatus for a can of canned goods according to claim 7, wherein when a lid and a bottom of the can are composed of mutually different metals, the can is disposed such that the lid or the bottom with as relatively low sensitivity with respect to the displacement meter is positioned on a lower side.

\* \* \* \* \*